United States Patent [19]

Novinger

[11] 4,304,223
[45] * Dec. 8, 1981

[54] FIBROUS ABSORBER SOLAR COLLECTOR

[76] Inventor: Harry E. Novinger, 4961 S. Chester St., Englewood, Colo. 80111

[ * ] Notice: The portion of the term of this patent subsequent to Dec. 11, 1996, has been disclaimed.

[21] Appl. No.: 93,639

[22] Filed: Nov. 13, 1979

Related U.S. Application Data

[63] Continuation of Ser. No. 960,766, Nov. 15, 1978, abandoned, and a continuation of Ser. No. 819,113, Jul. 26, 1977, abandoned.

[51] Int. Cl.³ .............................................. F24J 3/02
[52] U.S. Cl. .................................... 126/444; 126/449; 126/901
[58] Field of Search ............... 126/444, 448, 442, 449, 126/441, 901; 165/174

[56] References Cited

U.S. PATENT DOCUMENTS 4,067,316  1/1978  Brin ..................................... 126/441
4,082,082  4/1978  Harvey ................................ 126/449
4,098,331  7/1978  Ford et al. .......................... 126/448
4,119,083  10/1978  Heyen et al. ...................... 126/449
4,120,286  10/1978  Farber ................................ 126/448
4,129,117  12/1978  Harvey ............................... 126/432
4,177,794  12/1979  Novinger ........................... 126/449
4,223,665  9/1980  Lowe .................................. 126/449

Primary Examiner—Daniel J. O'Connor

[57] ABSTRACT

A lightweight and durable solar collector employing a fibrous absorber. Sufficient fiber mass may be used to blanket all radiation. The absorber is disposed between a transparent cover and a heat insulating shield behind which may be a rigid collector container. A reflector disposed between the absorber and the insulation is optional. Air enters the collector passes into a duct near bottom of the absorber and across the width of the absorber, flows parallel to and through the thinnest dimension of the absorber conducting heat from the fiber at the depths of greatest absorption and then exits through a similar duct located near the top of the absorber and out of the collector.

6 Claims, 2 Drawing Figures

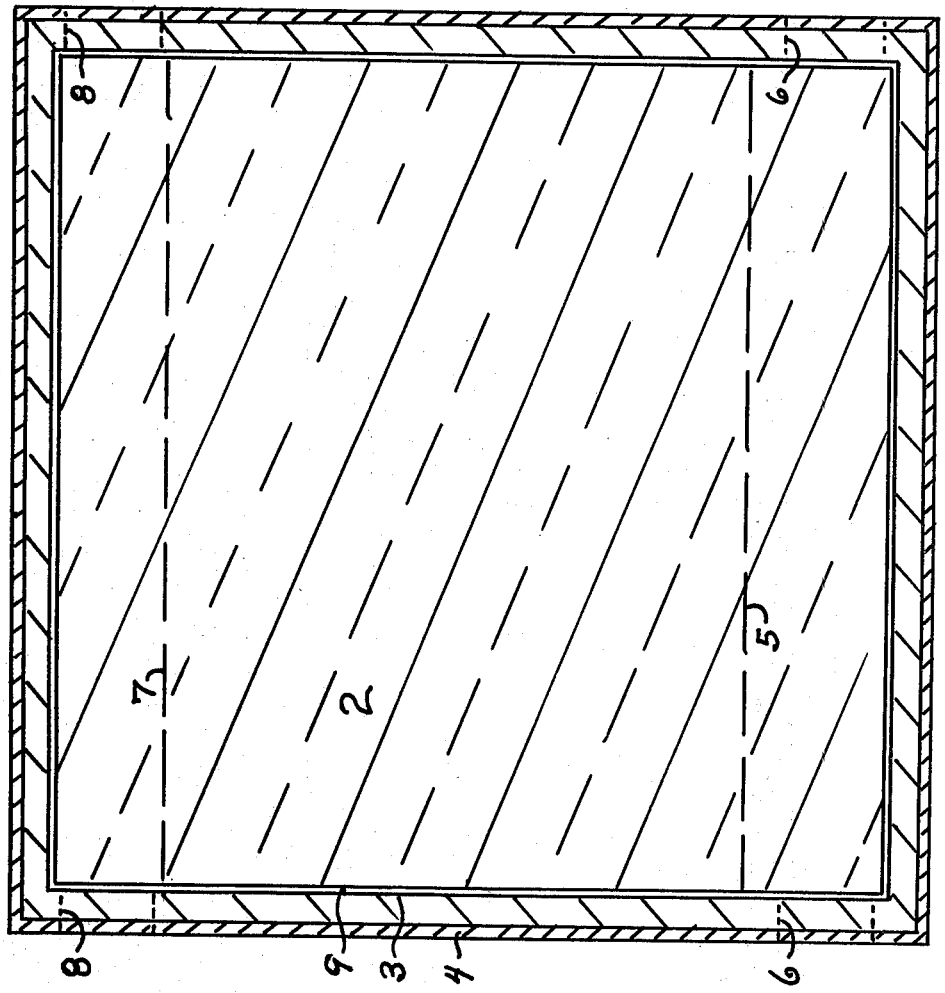
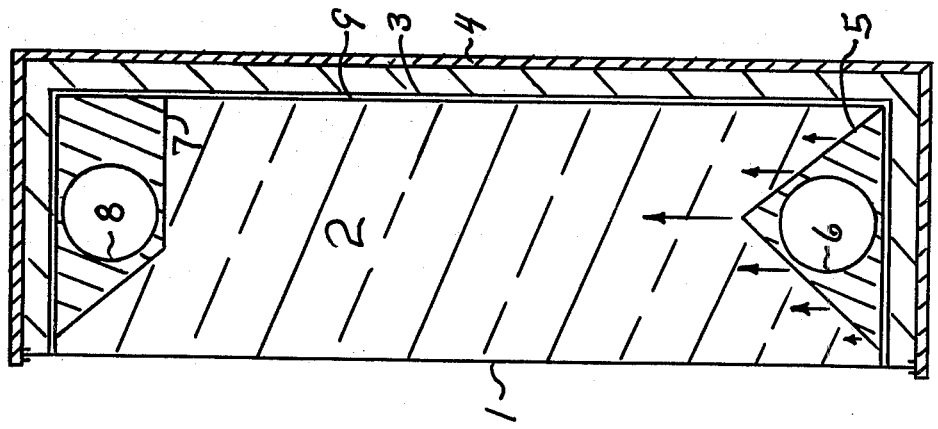
FIG. 2
FIG. 1

FIBROUS ABSORBER SOLAR COLLECTOR

This is a continuation of pending application Ser. No. 960,766 filed Nov. 15, 1978 and a continuation of Ser. No. 819,113 filed July 26, 1977 both of the same title, both now abandoned.

FIELD OF THE INVENTION

The invention relates to solar energy and more particularly to collection of radiant heat by fibrous absorbers in collectors that are constructed similiarly to flat plate absorber type collectors.

FURTHER BACKGROUND

The invention is an air type solar collector with a highly absorptive radiation absorber. The absorber is constructed in three dimensions. Instead of attempts at increasing the depth of a surface as attempts have been made with flat plate absorbers, my absorber has depth built in. Instead of passing the conducting air against one or both sides of known absorbers; in this invention, air passes through an interstitial body that has tissue which may be comprised of great numbers of fibrous cylindrical surfaces like but not limited to small sized fibers having a collective surface area several times the surface area of a flat plate including its fins if so equipped. Thus, its depth and great surface area provide for high efficiency in the essential critical requirements and properties desirable in a solar collector absorber.

The collector's first cost is low because it is simple and easy to manufacture and contains economical materials. It is lightweight because of its simplicity and porous structure. Its great absorber surface area results in corresponding ability to absorb solar radiation, and efficiently conserve heat losses because the heated fibers are in close proximity to other fibers of like temperature and insulated by distance from unlike structures and temperatures.

The absorber material such as fibers may be selected for low cost and absorbing qualities. It may, when necessary, receive selective coatings for increased radiation absorption, relative position fixing and durability. They may have a cross-sectional size as small as rock-wool or metal wools like fine steel wool. The fibers are fixed to cohere in irregular arrangement relative to each other. They are separated by air from each other to the extent practical to provide a three dimensional absorber perforated to the extent that substantially all the solar energy transmitted by the transpatent cover penetrates the absorber in depth, for good air passage as the conducting fluid, yet close enough to provide sufficient mass within a practical absorber depth for blanketing and absorbing essentially all the solar radiation penetrating the absorber. When necessary the fibers are fixed in position with high thermal adhesive.

The depth or thickness of the absorber may exceed ten centimeters for the ordinary house collector. Design depth is determined by the distance between the cool and warm air ducts, distance between fibers, type of operation such as passive flow or active flow, and whether a reflector is used behind the absorber mass. Fiber mass may be decreased when a reflective shield is located behind the absorber. The reflector may act as a partial substitute for depth or density, or both as it reflects scattered and spurious radiation back to the fibers bypassed.

The absorber is disposed between a transparent cover of highly acceptable critical properties for solar collecting and an insulation shield when a reflector is not used. About the insulation, a container is fitted to provide rigidity to the collector parts and for mounting the collector to other collectors, their duct works and to a parent support.

The collector air ducts connect to the larger absorber air ducts in any manner desired. The absorber ducts may vary in shape depending on type of transparent cover, the thickness or depth of the absorber, or the presence of a reflective shield, for varying air recovery speeds within the absorber, and for slowing recovery adjacent the cover to decrease conduction.

Slowing of rate of air recovery adjacent a transparent cover of single glazing is desirable; however, when the cover is insulated as with double glazing, the absorber ducts may be shaped to increase the recovery rate adjacent the cover. Increased flow adjacent the cover is efficient when heavy fiber density is used with double glazing.

Air enters at the cool air ducts located at the bottom of the collector, replaces the air between the fibers that has been warmed by them and exits via the warm air ducts located at the top of the collector.

As long as the heighth of the collector is kept within operating limits, the collector may easily be made in several shapes and dimensions. One or several collectors may be used to frame a window or a door. Thus, it may substitute for exterior wall or roof coverings or the complete wall while providing good absorbing performance even in vertical walls and at angles not perpendicular to the sun. Reinforced, it could serve as the walls and roof of a building. It may be priced low enough to be employed at angles and tilts whereby it can be utilized only part of each day.

DESCRIPTION OF THE PRIOR ART

The use of various fibrous and porous materials as solar collectors is not new. For example, Ashman el al in U.S. Pat. No. 3,220,671 teaches one preferably of glass wool which is blackened in any suitable fashion and having fibers in the 1 to 3 micron diameter range, or even finer. He further teaches that diameters larger than 3 microns result in excessively heavy fibers. Applicant however prefers rock wool that has fibers exceeding Ashman's range and fibers that are naturally dark. The darker shades of rock wool possess superior absorbing properties and significantly different physical and chemical characteristics to those of glass wool.

Several materials such as glass wool, asbestos, rock wool, slag wool and others vitreous fibrous materials are broadly classified by the term mineral wool. Of these, rock and slag wools are widely used for thermal insulation. As such, they are manufactured to contain a minimum amount of shot, in dark colors more often near dark brown shades than black shades and to contain considerable resiliency and other good thermal insulating characteristics. These also possess some good thermal absorption characteristics but would possess more if manufactured with some of the insulation qualities removed. These rock wool characteristics have not been found in the prior art. Rock wools also have larger fibers and have greater density than glass wool as rock wool is commonly in the 5 to 9 micron range and weighs about 1.5 lbs./cu.ft. Applicant's absorption comparison tests of the darker rock wools and blackened glass wool show rock wools clearly more efficient than blackened glass wool. The shot (metallic particles) attached to the fibers of rock wool assist in making it an efficient absorber. After about 50% of the shot was dislodged when the fibers were beat with a board, tests following removal resulted in the denatured rock wool again superior in absorption to glass wool although not as significantly as before shot removal. Comparison tests between dark and lighter colored rock wools show the darker colors to run hotter than the lighter colors; thus, color is significant in efficiency. The rock wools are far more practical in color fade, and in cost because of the black color coating cost for glass wool while rock wool naturally contains a permanent dark color.

Applicant uses a reflector to decrease the depth of his absorber as an option when space requires a thinner depth. Reflectors are used variously in the art. The closest known to applicant is Keyes et al in U.S. Pat. No. 3,987,786; however, the reflective coating on element 42 in Keyes is not designed to reflect heat passing through an absorber back onto the absorber as by applicant, but rather is directed in Keyes to better retain heat within his storage chamber so that heat exchange may take place beneath the collector rather than over the collector as by applicant. Thus, they are used differently and produce different results.

This invention solves the inefficient techniques for transfer of heat as taught by the prior art. Most of the fibrous art teaches duct flow substantially perpendicular to the least dimension of the absorber. These are extremely inefficient. Although others suggest ducting their transfer fluid parallel to and through the thinnest (depth) dimension as applicant, none known to applicant suggests ducting it through the depths of greatest heat absorption for optimum efficiency as does this invention.

In this, it is known that due to irregular internal geometry of fibrous and other like absorbers, the heat transfer and fluid flow processes are extremely complicated. Local air temperatures involve varied boundary-layer regions, wake regions and decreased resistance areas, all existing simultaneously within a location boundary of the absorber. All prior art known to applicant only provides means to route fluid along routes of the least resistance which results to over cool some fibers and by pass others. In this, the internal geometry provides decreased resistance areas that permits the flow to by-pass the areas of increased resistance to the flow resulting in less heating of the fluid transfer agent. Applicant controls his flow through more heated location boundaries. Thus, almost all of his fluid is heated compared to the prior art not having selectively shaped ducts as does applicant.

Heyen et al, in U.S. Pat. No. 4,119,083, provides only an uncontrolled flow path in his absorber; a path that "passes freely through the absorber". Applicant's invention provides for multiple controlled flow paths in the absorber.

Johnson, in U.S. Pat. No. 3,875,925, provides a heat collecting chamber associated with parallel heat valves and an absorbing back wall of similar size as the valves. The chamber functions as spacing between the heat valves and back wall and as a flow path associated with the collector heated air exit duct.

The absorber structures of Heyen et al and Johnson, separately and collectively, do not suggest structuring a duct to penetrate an absorber in a manner to provide different amounts of fiber across the airflow paths within the absorber to subject the transfer fluid to different resistances to cause greater flow speeds through the depths of fiber of greater heat absorption and lesser flow speeds through the depths of fiber of lesser heat absorption for optimal heat transfer. Neither art hints at the need to improve heat transfer at depths of the absorber of greatest heat absorption or to supply lesser flow to the fibers receiving lesser sun. Neither art hints at the need for a solution to the above internal geometry flow problems.

Of all art known to applicant, some teach uniform flow within the absorber and some teach particular flow paths exterior the absorber associated with the collector ducts of the collector cover for maximum heat transfer. None applies the phrases "optimal air flow", "greatest heat absorption", "maximum heat transfer" and the like to the air flow paths in their absorbers.

Solar heating of the fibers decreases with depth of absorber penetration. The outer or front portion of the absorber's mesh of fibers will receive the most radiation in absorbers having like fiber density at all depths; but, unless near by glazing is insulated in some manner, the best depths for rapid removal of heat lies a short distance inside the top portion. Applicant's absorber ducts provide the techniques for optimum heat removal at any depths of the absorber's fibers.

BRIEF SUMMARY OF THE INVENTION

This collector provides a container with its front cover transparent. A rock wool fibrous absorber is disposed behind the transparent front. The rock wool is naturally dark in color, doesn't fade and provides long life while being an efficient heat absorber.

This absorber contains ducts across its bottom side for cool air distribution throughout its width. A similar duct at its top receives this air after it removes heat absorbed by the sun heated fibers. The two ducts are shaped as required to effect the air recovery speeds within the mesh of fibers of the absorber so as to direct the most air through the depths of greatest absorption of heat. These depths lie parallel to the transparent front and to the least dimension of the mass of fibers. Great efficiency results when air is channeled parallel through these depths of greatest absorption and at controlled distribution speeds over the fibers at the selected depths. Thus, the cooler depths receive less air for optimum efficiency.

A primary object of the invention, therefore, is to provide a solar collector that is practical in price and use while converting solar radiation to heat in air for passive or active heating of buildings. Other objects, features and advantages of this invention include applications of its highly efficient absorber and the collector's simplicity of structure, economical manufacture, durability, lightweight, wide adaption to different shapes and sizes and others as will become more apparent upon reference to the succeeding detailed description thereof, and to the drawings illustrating the preferred embodiments thereof:

BRIEF DESCRIPTION OF THE DRAWINGS

FIG. 1 is a diagrammatic cross sectional edge view showing depth and heighth as an embodiment of the invention.

FIG. 2 is a diagrammatic frontal view showing width and heighth of the embodiment in FIG. 1.

DESCRIPTION OF THE PREFERRED EMBODIMENTS

FIG. 1 shows the transparent cover 1, the fibrous absorber 2 behind the cover, the reflector shield 9 behind the absorber 2, the insulator shield 3 behind the reflector shield 9, the container 4 behind and fitted about the insulation 3, the absorber cool air duct 5, the absorber warm air duct 7, the collector cool air duct 6, and the collector warm air duct 8.

Only essential details of construction and operation of the collector per se are given as they are known and are therefore believed to be unnecessary for an understanding of the invention.

In operation, referring to FIG. 2, cool air enters the collector through either one or both ducts 6, depending on the number of collectors used and their method of employment. Absorber cool air duct 5 provides distribution over the lower width and depth of absorber 2. The air then passes between the fibers or fibrous material comprising absorber 2 where it may expand when conductively heated by the fibers. Then the warmed air is routed via absorber warm air duct 7 out of the collector through either one or both ducts 8.

These collector inlet and outlet ducts, cooperating with the absorber ducts, may permit the passage of cool air through more than one collector before being heated, and similar routing of warm air through the warm air ducts of more than one collector without further undesirable heating. This arrangement is an improvement over collectors connected in series whereby the warm air of one is further heated by the other one resulting in loss of efficiency.

Referring to FIG. 1, the depth of absorber 2 permits highly efficient radiation absorption because deep radiation penetration is possible. Unlike the shallow penetration characteristic of flat plate absorbers which may be measured in microns, the penetration of this absorber 2 may be measured in centimeters. This in-depth physical arrangement of the absorber fibers with spacing between provides for good radiation entrapment at angles other than perpendicular to the sun. The radiation penetrates in depth before it reflects or extensively scatters and once inside, the in-depth fiber arrangement and mass provides near opacity for what scattering does occur. Reflective shield 9 may be used to decrease the fiber mass and assist as an insulation. Re-radiation and reflected radiation from fibers are extensively blocked by fibers located in the outer portion nearer transparent cover 1. As a result, little reradiated energy is lost to cover 1. Likewise, cover 1 conducts little heat from absorber 2 because convection currents generated by the thousands of fibers are not individually strong enough to reach the cover except for the small percentage located in close proximity thereto. The depth also provides for great mass and great surface area behind a relatively small collector frontal surface.

Absorber 2 fibers may be fixed in selected density by adhesive applied at time of density arrangement. The fibers and their arrangements remain stable and durable during stagnation periods of high temperatures.

Rock wool and steel wool remain in stable arrangements in most practical densities without adhesive. Steel wool is not durable unless coated against rust. Rock wool is durable and may exceed the life of its collector parts. Rock wool remains stable by natural friction between fibers and durable by its natural thin layer of tough magnetic oxide $Fe_3O_4$. This layer is formed about all the fibers and about the small particles of metals that attach to each fiber when the superheated steam forms the fibers in normal rock wool manufacture. Rock wool is prevented from rusting and color degradation by this natural coating. The metal particles readily conduct heat and provide a natural friction for stabilizing the fiber arrangement.

Cool air duct 5 may be concave shaped as shown in FIG. 1 to shorten the distance and resistance to air flow at middepth. Similarly, warm air duct 7 may be shaped to assist the flow at any depth of absorber desired. Increased flow at middepth or farther back proportionally reduces the flow near cover 1 to further reduce conduction loss. Arrows show relative speeds in FIG. 1. Without changing shapes of ducts 5 and 7, the normal depth of absorber 2 results in a very large volume of air movement compared to the small volume that contacts cover 1. The arrows also indicate the direction of the air flow parallel to the thinnest dimension of the absorber as it flows from duct 5 to duct 7.

One of the important purposes of applicant's invention is to control and direct air flow for increasing the rate of airflow through the absorber's mesh of fibers where the greatest thermal heating occurs. The density of the absorber's fibers determines depth to which heating occurs, but this depth is modified by convection currents, reradiation, the amount of heat accumulated, the distance between ducts and the speed of air recovery. Ducts 5 and 7 are located opposite and parallel each other and extending across opposite sides of the mesh fibers and extended to join the container ducts for fluid cooperation therewith. This provides even pressure drop and air flow throughout the width of the absorber mesh of fibers at any one selected depth.

While the invention has been described and shown in its preferred embodiments, it will be clear to those skilled in the arts to which it pertains that many changes and modifications may be made thereto without departing from the scope of the invention.

I now claim:

1. A solar collector comprising:
   a container including a front wall having a transparent portion, a back wall, side walls, and portions defining ducts; and
   an absorber member behind the front wall; the absorber member including a mesh of fibers having a high coefficient of absorption for absorbing solar heat, and having portions defining portions of at least one duct formed in association with the container and operative to duct a heat transfer fluid through the container and at different relative speeds in flow paths parallel to and through the thinnest dimension of the mesh of fibers, and formed across the width of the mesh of fibers while penetrating different distances across its depth providing different amounts of fiber across the flow paths to subject the transfer fluid to different fiber resistances causing higher flow speeds through depths of fibers of higher heat absorption and lower flow speeds through depths of fibers of lower heat absorption for higher efficiency of heat transfer.

2. A solar collector comprising:
   a container including a front wall having a transparent portion, a back wall, and side walls;
   an absorber member behind the front wall, the absorber member including a mesh of fibers having a high coefficient of absorption for absorbing solar heat; and means for transfer of heat associated with the container and the absorber and operative to duct a heat transfer fluid through the container and at different relative speeds in flow paths parallel to and through the thinnest dimension of the mesh of fibers; portions of the container and the mesh of fibers defining ducts, and at least one of the ducts formed in association with the mesh of fibers so as to extend across the width of the mesh of fibers while penetrating different distances across its depth providing different amounts of fiber across the flow paths to subject the transfer fluid to different fiber resistances causing greater flow speeds through depths of fibers of greater heat absorption and lesser flow speeds through depths of fibers of lesser heat absorption for optimal heat transfer from the absorber and the collector.

3. A solar collector comprising:

a container including a front wall having a transparent portion, a back wall, and side walls;

an absorber member behind the front wall, the absorber member including a mesh of fibers having a high coefficient of absorption for absorbing solar heat; and duct means for transfer of heat associated with the container and the absorber and operative to duct a heat transfer fluid through the container and at different relative speeds in flow paths parallel to and through the thinnest dimension of the mesh of fibers of the absorber; the duct means including a duct located across one side of the absorber mesh of fibers and another duct located across the opposite side of the mesh of fibers with the walls of each duct shaped by the inner surface of a container side wall and an outer surface side of the mesh of fibers to form a duct cavity across the width and the depth of the side of the mesh of fibers, and at least one of these sides of the mesh of fibers recessed to shape a portion of its co-located duct integral to and sloped into the side of the mesh of fibers equally across its width while penetrating different distances across its depth providing different amounts of fiber across the flow paths to subject the transfer fluid to different fiber resistances causing increased flow speeds through depths of the mesh of fibers of greatest heat absorption for optimal heat transfer.

4. The invention of claim 3, wherein the mesh of fibers is specially manufactured type mineral wool with special thermal absorbing characteristics.

5. A solar collector comprising:

a container including a front wall having a transparent portion, a back wall, and side walls;

an absorber member behind the front wall, the absorber member including a mesh of natural dark mineral wool; and duct means for transfer of heat associated with the container and the absorber and operative to duct a heat transfer fluid through the container and at different relative speeds in flow paths parallel to and through the thinnest dimension of the mesh of fibers; the duct means including at least one inlet container duct and one outlet container duct; the duct means further including a duct associated with one side of the mesh of fibers and another duct associated with the opposite side of the mesh of fibers with portions of the walls of each duct shaped by the inner surfaces of the container and portions of the mesh of fibers to form a duct cavity across the width and the heated depth of the mesh of fibers, and at least one of the ducts associated with a side of the mesh of fibers further shaped across the width of the mesh of fibers while penetrating the mesh of fibers different distances across its heated depth providing different amounts of fiber across the flow paths to subject the transfer fluid to different fiber resistances causing different flow speeds through depths of the mesh of fibers of different heat absorptions for optimal heat transfer.

6. The invention of claim 4, wherein the mineral wool is specially manufactured type rockwool with special thermal absorbing characteristics, and these special characteristics include increased blackness.

* * * * *